US005214262A

United States Patent [19]

Carkhuff

[11] Patent Number: 5,214,262

[45] Date of Patent: May 25, 1993

[54] ELECTRODE ADAPTOR

[75] Inventor: Donald W. Carkhuff, Florence, S.C.

[73] Assignee: ESAB Welding Products, Inc., Florence, S.C.

[21] Appl. No.: 862,785

[22] Filed: Apr. 3, 1992

[51] Int. Cl.[5] .......... B23K 9/00

[52] U.S. Cl. .......... 219/121.48; 219/121.49; 219/121.5; 219/75

[58] Field of Search .......... 219/121.48, 121.49, 219/121.51, 121.5, 74, 75, 121.39

[56] References Cited

U.S. PATENT DOCUMENTS

| | | | |
|---|---|---|---|
| 3,571,556 | 3/1971 | Wustner . | |
| 3,604,889 | 9/1971 | Rohrberg . | |
| 4,625,094 | 11/1986 | Marhic et al. | 219/121.5 |
| 4,650,956 | 3/1987 | Marhic et al. . | |
| 4,748,312 | 5/1988 | Hatch et al. | 219/121.52 |
| 4,855,563 | 8/1989 | Beresnev et al. . | |
| 4,973,816 | 11/1990 | Haberman | 219/121.48 |
| 5,039,837 | 8/1991 | Nourbakhsh et al. . | |

*Primary Examiner*—Mark H. Paschall
*Attorney, Agent, or Firm*—Bell, Seltzer, Park & Gibson

[57] ABSTRACT

A plasma torch assembly that provides a removable and replaceable barrier to prevent catastrophic failure of a plasma arc torch following failure of an electrode. The torch assembly comprises the combination of an electrode body for providing an electrical path in a plasma arc torch, an electrode, and an electrode adaptor positioned between the electrode body and the electrode and formed of an electrically conductive material. The adaptor comprises an adaptor body portion having structure for removably fitting the adaptor body to the electrode body and structure for removably fitting the adaptor body to the electrode so that the adaptor forms an electrically conductive path between the electrode body and the electrode and contains features and components essential to the gas distribution.

20 Claims, 2 Drawing Sheets

ELECTRODE ADAPTOR

FIELD OF THE INVENTION

The present invention relates to plasma arc torches, and in particular relates to a removable and replaceable adaptor that helps prevent catastrophic failure of the torch should the electrode fail.

BACKGROUND OF THE INVENTION

Plasma arc cutting is a metal working technique in which the heat required to cut, sever, or perform similar functions on metals is provided by a plasma; i.e. a form in which matter has been heated to an extent and under conditions in which all of the elements are present in ionized or atomic form. In most circumstances, the most efficient way to initiate and generate a plasma is by the application of a sufficient potential difference (voltage drop) between an anode and cathode in the presence of the material from which the plasma is formed, typically a flowing gas. In one form of plasma arc cutting referred to as transferred arc, the potential difference is applied between an electrode in the torch and a metal workpiece itself.

The extreme conditions under which plasmas are formed and maintained are generally harsh on the equipment being used, particularly the torch electrodes. As a result, the torch electrode often includes a small insert of an appropriate metal that is slowly consumed by the plasma. After a certain period of operation, the insert or electrode should desirably be replaced.

In actual use, however, torches are often operated for periods longer than the appropriate lifetime of an insert or an electrode. Under these circumstances, the insert and electrode can suffer a catastrophic failure; i.e. a short circuit or the like in which the large potential difference used to generate the plasma becomes misdirected and severely damages or destroys the operative portions of the torch.

In this regard, those familiar with such torches recognize that they generally include relatively sophisticated gas flow passages in metal parts that direct plasma gases and gas mixtures to the electrode, and often also direct cooling gases—sometimes an alternate flow of the same gas or gas mixture used to generate the plasma—to the torch nozzle and other portions of the torch. It will be readily understood that even partial failure of a torch can easily damage or destroy such passages, resulting in an otherwise useless torch, even if the remainder of the torch escapes damage.

A torch can also be damaged when metal from a cut or weld being carried out by the torch, splashes back upon the torch nozzle. Therefore, to the extent that the splash-back from cutting or gouging operations can be minimized or eliminated, the expected lifetime of the plasma arc torch can be extended.

OBJECT AND SUMMARY OF THE INVENTION

Therefore, it is an object of the present invention to provide a plasma torch which prevents failure of the electrode, or other related problems, from causing a corresponding catastrophic failure of the remainder of the torch, and particularly the sophisticated gas passages and the means for removably fitting the electrode. The invention meets this and other objects with a torch assembly that comprises the combination of an electrode body for providing an electrical path in a plasma arc torch, an electrode, and an electrode adaptor positioned between the electrode body and the electrode and formed of an electrically conductive material. The adaptor comprises an adaptor body portion having means for removably fitting the adaptor body to the electrode body and means for removably fitting the adaptor body to the electrode so that the adaptor forms an electrically conductive path between the electrode body and the electrode.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DETAILED DESCRIPTION

Figure 1:
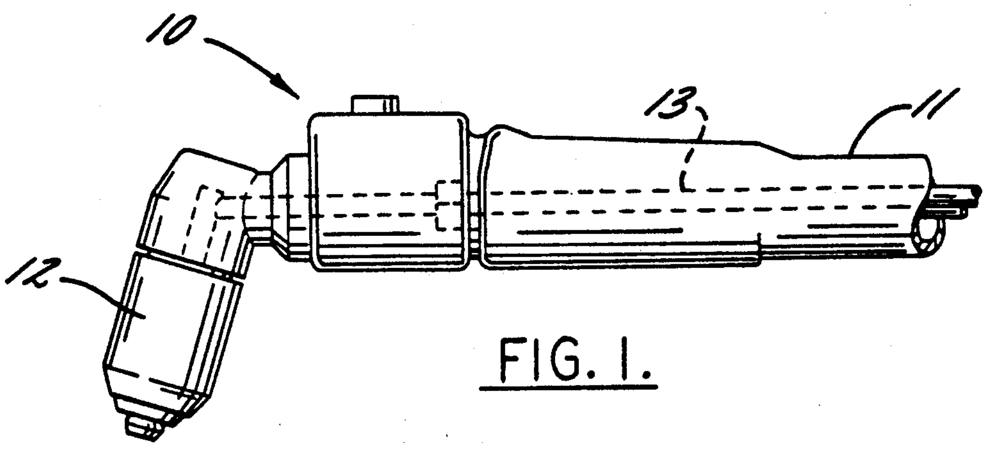
FIG. 1 is a side elevational view of a plasma arc torch.

FIG. 1 is an overall side elevational view of a plasma arc torch broadly designated at 10. The general construction and operation of the main portions of such a torch are well known in the art and will not be otherwise described in detail except to note that the torch includes a main body portion 11 and a nozzle portion 12, which in the illustrated embodiment is positioned at an angle with respect to the body 11. Those familiar with such torches know that the nozzle portion 12 can also be arranged in line with the body portion 11 to form a pencil type arrangement common in this art.

The torch 10 also includes one or more passages indicated at 13 through which the plasma arc gas can travel from a supply (not shown) to the nozzle portion 12. As is further known to those familiar with plasma arc welding, typically one or more gases will be used for both forming the plasma arc, and for being directed in a cooling stream throughout the interior and exterior of the nozzle portion 12 to help moderate the effects of the high temperatures of the plasma.

The invention is a plasma arc torch assembly that provides a removable and replaceable barrier to prevent catastrophic failure of a plasma arc torch following failure of an electrode. The assembly comprises the combination of an electrode body illustrated in FIG. 2 at 14. An electrode 15 and an electrode adapter 16 positioned between the electrode body 14 and the electrode 15, and preferably formed of an electrically conductive material.

The overall torch structure further includes a generally cylindrical insulator 17 that forms the outermost portions of the plasma torch, a retaining member insulator 20 that, similarly forms the outermost portions of the lowest part of the torch, a nozzle retaining member 21 carried by the retaining member insulator 20, and a nozzle 22 carried by the retaining member 21 in spaced surrounding relationship to the electrode 15. The nozzle 22 has a nozzle orifice 23 therein through which a plasma gas can pass to form the plasma arc. The nozzle 22 and the retaining member 21 are formed of electrically conductive materials and are in conductive contact with one another.

The overall torch assembly 10 further comprises means for providing a pilot arc current to the retaining member 21 and to the nozzle 22 for initiating a plasma arc in the torch between the nozzle and the electrode that can, in turn, initiate a transferred plasma arc between the electrode and a metal workpiece. In the embodiment illustrated in FIG. 2, this means comprises the pilot arc body 24.

In preferred embodiments, the nozzle 22, the electrode 15, the electrode body 14, the adaptor 16, and the retaining member 21 are all formed of a conductive member for these purposes.

Figure 2:
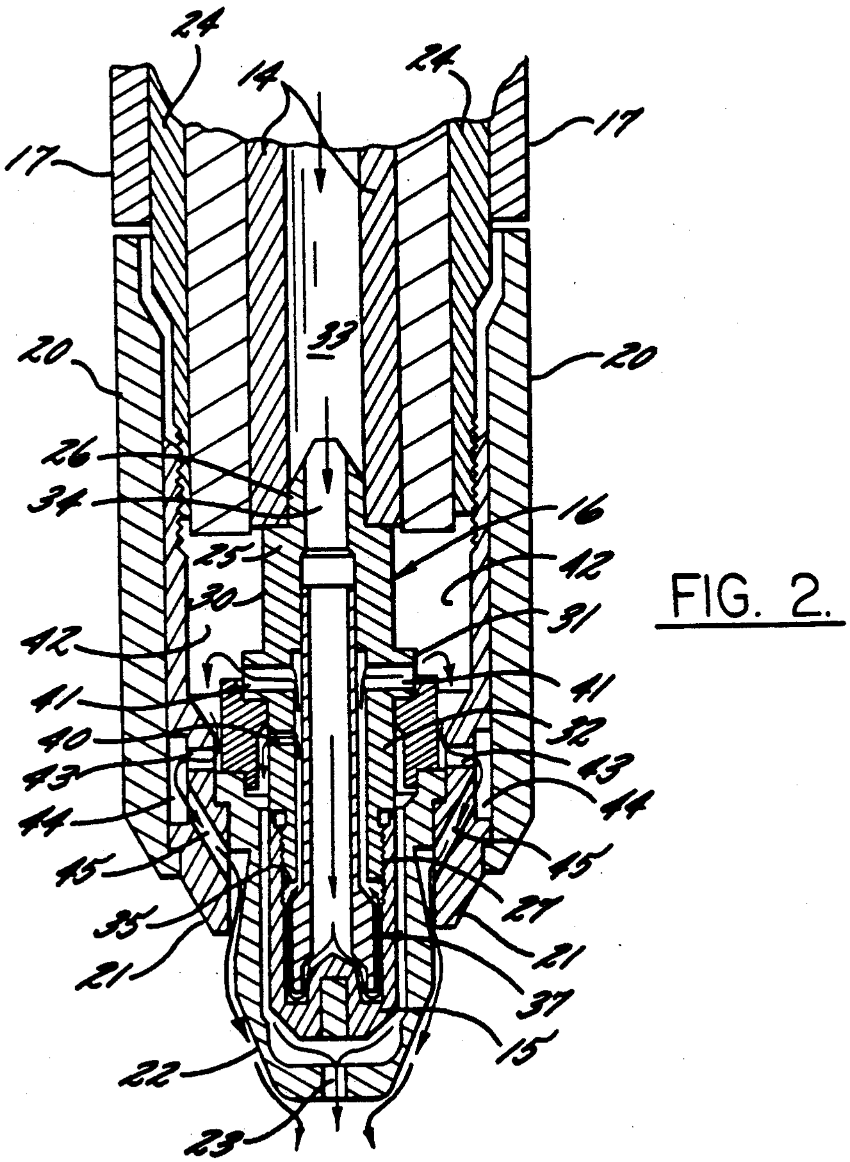
FIG. 2 is a cross-sectional view of a number of the operational portions of a plasma arc torch.

In preferred embodiments of the invention, the adaptor 16 is formed of a main body portion 25 that has means shown as the upper portions 26 and the threaded lower portions 27 for removably fitting the adaptor body to the electrode body 14 and to the electrode 15 so that the adaptor 16 forms an electrically conductive path between the electrode body 14 and the electrode 15. As illustrated in FIG. 2, the adaptor body 25 comprises at least two annular portions longitudinally adjacent along a common axis with each portion having a different radius as measured from the common axis to the outer surface of each portion. Two of these portions, the upper portion 26 and the lower portion 27, have already been identified and designated. FIG. 2 also illustrates additional annular portions 30, 31, and 32. In preferred embodiments there are at least three such annular portions. As illustrated in FIG. 2 the upper portion 26 forms a seat between the adaptor 16 and the electrode body 14. The seat provides a good electrical contact between the adaptor 16 and the electrode body 14 when the retaining member 21 holds them in place.

As further illustrated in FIG. 2, the electrode body 14 is a cylinder that defines a central longitudinal bore 33 therethrough. As described previously, the means for removably fitting the adaptor body 25 to the electrode body 14 comprises one terminal annular portion 26 of the adaptor body 25 having an exterior diameter that is substantially equivalent to, but slightly smaller than, the diameter of the longitudinal bore 33 so that the terminal annular portion 26 fits snugly within the bore 33 to thereby removably join the electrode body 14 and the adaptor body 25. FIG. 2 illustrates the relationship between the annular portion 26 and the electrode body as a slip fit, but it will be understood that other removable engagements, such as threads, are equivalent.

The electrode adaptor 16 further comprises a central conduit 34, which in the embodiment illustrated in FIG. 2, is cylindrical and coaxial and in communication with the central bore 33 of the electrode body 14. The central conduit 34 through the adaptor 16 provides a gas flow path to the electrode 15.

The electrode 15 comprises a substantially hollow electrode of which rear portions form a mouth thereinto, which in the preferred embodiments further comprise a set of female threads 35. When these are engaged with the male threads on annular portion 27 of the electrode adaptor body 25, they provide the means for removably fitting the electrode adaptor 16 to the electrode 15.

Figure 4:
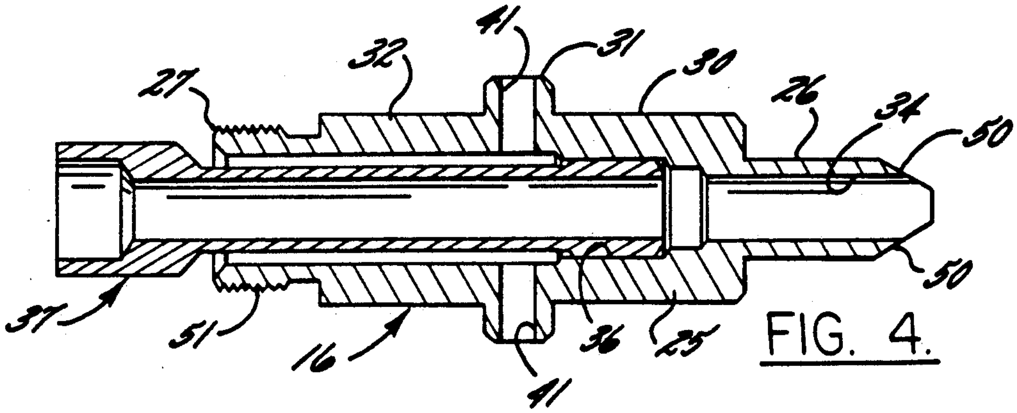
FIG. 4 is a cross-sectional view taken along lines 4—4 of FIG. 3.

As further illustrated in FIG. 2, in preferred embodiments the central conduit 34 is also coaxial with the common axis of the annular portions 26, 30, 31, 32, and 27. In more preferred embodiments, the central conduit 34 further comprises means shown as the interior diameter portion 36 (FIG. 4) for carrying a cylindrical cooling baffle 37 therein. The cooling baffle 37 extends from the adaptor body 25 into rear portions of the electrode 15 and provides a path for cooling gas to more efficiently reach the interior rear portions of the electrode 15. Furthermore, in preferred embodiments, the interior diameter of the central conduit 34 is larger than the exterior diameter of the cylindrical cooling baffle 37 so that the conduit and the cooling baffle together define an annular gas flow passage between the exterior surface of the cooling baffle 37 and the interior surface of the conduit 34.

Figure 3:
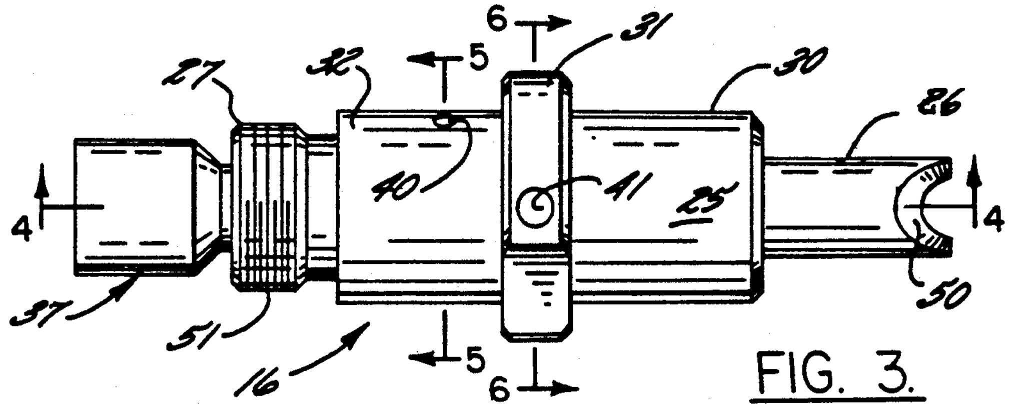
FIG. 3 is a side elevational view of an electrode adaptor and cooling baffle according to the present invention.
Figure 5:
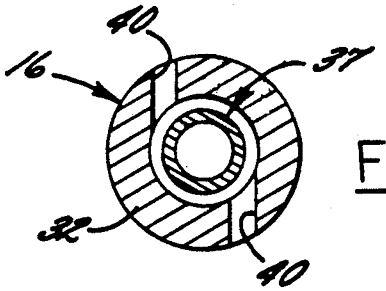
FIG. 5 is a cross-sectional view taken along lines 5—5 of FIG. 3.
Figure 6:
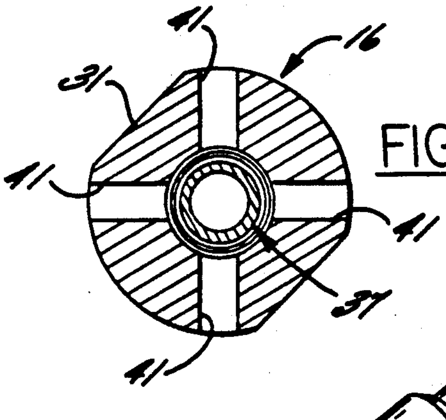
FIG. 6 is a cross-sectional view taken along lines 6—6 of FIG. 3.
Figure 7:
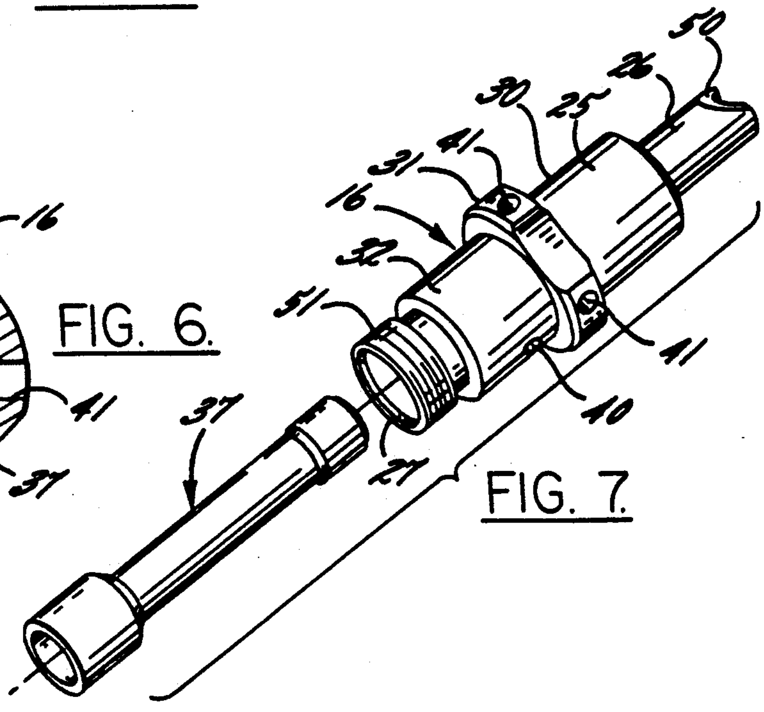
FIG. 7 is an exploded perspective view of the adaptor and the cooling baffle.

As noted previously, one of the results of catastrophic failure of a torch is that the relatively sophisticated gas flow passages are destroyed, as well as the means for attaching an electrode, thus effectively destroying the entire torch for operational purposes. The invention overcomes this problem by providing gas flow passages and electrode attachment means in the replaceable electrode adaptor so that if catastrophic failure of the torch occurs, the probability is greatly increased that all of the necessary parts, including the gas flow passages, can be quickly and easily replaced. In that regard, the adaptor 16 further comprises a first set of tangential plasma gas exit ports 40 perpendicular to the central conduit and in fluid communication with the central conduit 34 for providing a gas flow path from the conduit to the exterior of the electrode. These are also illustrated in FIGS. 3, 5, and 7. In particular, in the embodiments that include the cooling baffle 37, the plasma gas exit ports 40 are adjacent the annular gas flow passage formed between the baffle 37 and the central conduit 34. In the illustrated embodiment, the plasma gas exiting through the exit holes 40 spirals downwardly between the electrode 15 and the nozzle 22 until it exits from the nozzle orifice 23. As stated earlier, when an appropriate potential difference is applied between the electrode 15 and a workpiece, and with the flowing gas supplied at the proper rate, a plasma will be formed in the arc.

The adaptor further comprises a second set of ports 41 for cooling gas, which are perpendicular to the central conduit 34 and adjacent the annular gas flow passage, and that are in fluid communication with the central conduit 34 for providing a gas flow path from the conduit 34 to the exterior of the torch assembly 10. The parts 41 thereby help cool the torch and its tip during plasma arc operation. FIG. 2 illustrates that the cooling gas travels through the ports 41 into a plenum 42, then through a set of holes 43 in the retaining member 21, and then into a second plenum 44 formed between the retaining member 21 and the retaining member insulator 20. From the second plenum 44, the cooling gas flows through another set of passages 45 from which it impinges against rear portions of the nozzle 22, and then exits from an annulus defined between lowermost portions of the retaining member 21 and central portions of the nozzle 22.

As illustrated in FIG. 2, the nozzle 22 has a novel structure diverging and then converging structure. The advantages of the novel are described in copending application Ser. No. 07/863,215, to Everett, filed concurrently herewith, for "Plasma Torch Nozzle," the contents of which are incorporated entirely herein by reference.

In the illustrated embodiment, the cooling gas exit ports 41 are positioned within the annular portion 31 that has the largest radius, although it will be understood that this is appropriate to the illustrated embodiment, but not otherwise limiting of the structure. Furthermore, in preferred embodiments, the plasma gas ports 40 in the adaptor 16 are in a different annular portion from the cooling gas ports 41.

FIGS. 3 through 6 are side elevational, and cross-sectional views respectively of the electrode adaptor of the present invention broadly designated at 16. As illustrated therein, the electrode adaptor is formed of an electrically conductive metal adaptor body 25 that is formed of at least three annular portions joined longitudinally along a common axis. Each portion has a different radius as measured from the common axis to the outer surface of each portion, and in FIGS. 3 through 7 these portions are again respectively designated as 26, 30, 31, 32, and 27. Consistent with the illustration of FIG. 2, the adaptor comprises and defines a cylindrical central conduit 34 through the adaptor body 25 and coaxial with the common axis for providing a gas flow path through the adaptor to a torch electrode. The central conduit includes means shown as the smaller coaxial portion 36 for carrying a cooling baffle therein as described previously. The relationship between the baffle 37 and the adaptor 16 is illustrated as a slip fit, but is often a threaded engagement as well. The first set of plasma gas exit ports 40 are perpendicular and tangential to the central conduit 34 and are in fluid communication with the central conduit 34. When used in a torch embodiment such as is illustrated in FIG. 2, the exit ports 40 provide a gas flow path from the conduit 37 to the exterior of an electrode. A second set of exit ports 41 for cooling gas are also perpendicular to the central conduit 34 and are in fluid communication with the central conduit and positioned within a different annular portion, illustrated at 31, of the adaptor body 25 from the plasma gas exit ports. The second set of ports 41 provide a fluid flow path from the conduit to the exterior of a plasma torch assembly to thereby help cool the torch and its tip during plasma arc operation.

As illustrated in FIGS. 2 through 7, the upstream most annular portion 26 of the adaptor body 25 also has a series of beveled edges designated at 50, the purpose of which is to unseat a ball valve of the type commonly used for controlling gas flow in torches in a manner that is well-understood to those of ordinary skill in this art, and described in U.S. Pat. No. 4,580,032, the contents of which are incorporated entirely herein by reference. It will be understood that such aspects as the beveled portion 50, and the threads 51 for receiving an electrode are descriptive of the preferred embodiment, rather than limiting of the invention as described and claimed herein.

In the drawings and specification, there have been disclosed typical preferred embodiments of the invention, and although specific terms have been employed, they have been used in a generic and descriptive sense only and not for purposes of limitation, the scope of the invention being set forth in the following claims.

That which is claimed is:

1. A plasma torch assembly that provides a removable and replaceable barrier to prevent catastrophic failure of a plasma arc torch following failure of an electrode, said assembly comprising the combination of:

an electrically conductive electrode body for providing an electrical path and a gas passageway in a plasma arc torch;

an electrode; and an electrically conductive electrode adaptor positioned between said electrically conductive electrode body and said electrode and formed of an electrically conductive material, said electrode adaptor comprising an adaptor body portion having means for removably fitting said adaptor body to said electrically conductive electrode body and means for removably fitting said adaptor body to said electrode so that said adaptor forms an electrically conductive path between said electrode body and said electrode, a central conduit through said adaptor body portion and communicating with said gas passageway for providing a gas flow path through said adaptor from said electrode body to said electrode, a first set of plasma gas exit ports perpendicular to said central conduit and in fluid communication with said central conduit for providing a gas flow path from said conduit to the exterior of said electrode, and a second set of cooling gas fluid exit ports perpendicular to said central conduit and in fluid communication with said central conduit for providing a gas flow path from said conduit to the exterior of said torch assembly to thereby help cool the torch and its nozzle during plasma arc operation.

2. A plasma torch assembly according to claim 1 wherein said adaptor body comprises at least two annular portions longitudinally adjacent along a common axis with each portion having a different radius as measured from said common axis to the outer surface of each portion.

3. A plasma torch assembly according to claim 2 wherein said central conduit is cylindrical and coaxial with said common axis.

4. A plasma torch assembly according to claim 2 wherein said cooling gas exit ports are positioned within the annular portion having the largest radius.

5. A plasma torch assembly according to claim 1 wherein said central conduit of said adaptor further comprises means for carrying a cylindrical cooling baffle therein.

6. A plasma torch assembly according to claim 5 wherein said electrode comprises a substantially hollow electrode with rear portions of said electrode forming a mouth thereinto.

7. A plasma torch assembly according to claim 6 and further comprising a cooling baffle carried by said carrying means and extending from said adaptor body into rear portions of said electrode for providing a path for cooling gas to more efficiently reach the interior rear portions of said electrode.

8. A plasma torch assembly according to claim 7 wherein said cooling baffle comprises a cylinder.

9. A plasma torch assembly according to claim 8 wherein the interior diameter of said central conduit is larger than the exterior diameter of said cylindrical cooling baffle so that said conduit and said cooling baffle together define an annular gas flow passage between the exterior surface of said cooling baffle and the interior surface of said conduit.

10. A plasma torch assembly according to claim 9 wherein said cooling gas exit ports and said plasma gas exit ports are in fluid communication with adjacent said annular gas flow passage.

11. A plasma torch assembly that provides a removable and replaceable barrier to prevent catastrophic failure of a plasma arc torch following failure of an electrode, said assembly comprising the combination of:

an electrically conductive electrode body for providing an electrical path in a plasma arc torch;

a substantially hollow electrode with rear portions of said electrode forming a mouth thereinto; and an electrically conductive electrode adaptor positioned between said electrically conductive electrode body and said electrode and formed of an electrically conductive material and in physical and electrical contact with said electrode body and said electrode, said electrically conductive electrode adaptor comprising an adaptor body portion formed of at least three annular portions longitudinally adjacent along a common axis with each portion having a different radius as measured from said common axis to the outer surface of each portion a cylindrical central conduit through said adaptor portion and coaxial with said common axis for providing a fluid flow path through said adaptor to said electrode, means in said central conduit for carrying a cooling baffle therein, a cylindrical cooling baffle carried by said carrying means and extending from said adaptor body into rear portions of said electrode for providing a path for cooling gas to more efficiently reach the interior rear portions of said electrode, and wherein the interior diameter of said central conduit is larger tan the exterior diameter of said cylindrical cooling baffle so that said conduit and said cooling baffle together define an annular gas flow passage between the exterior surface of said cooling baffle and the interior surface of said conduit, a first set of plasma gas exit ports perpendicular to said central conduit and in fluid communication with said central conduit adjacent said annular gas flow passage for providing a gas flow path from said conduit to the exterior of said electrode, and a second set of cooling gas fluid exit ports perpendicular to said central conduit and in fluid communication with said central conduit adjacent said annular gas flow passage and positioned within the annular section of said adaptor body having the largest radius for providing a gas flow path from said conduit to the exterior of said torch assembly to thereby help cool the torch and its nozzle during plasma arc operation.

12. A plasma torch assembly according to claim 11 and wherein at least one of said annular portions of said adaptor body comprises means for removably fitting said adaptor body to said electrode body and wherein at least one other of said annular portions comprises means for removably fitting said adaptor body to said electrode so that said adaptor forms an electrically conductive path between said electrode body and said electrode.

13. A plasma torch assembly according to claim 12 wherein said mouth of said electrode comprises a set of female threads and said means for removably fitting said electrode adaptor to said electrode comprises a corresponding set of male threads.

14. A plasma torch assembly according to claim 12 wherein said electrode body is a cylinder with a central longitudinal bore therethrough, and wherein said means for removably fitting said adaptor body to said electrode body comprises one terminal annular portion of said adaptor body having an exterior diameter that is substantially equivalent to, but slightly smaller than, the diameter of said longitudinal bore so that said terminal annular portion fits snugly within said bore to thereby removably join said electrode body and said adaptor body.

15. A plasma torch assembly according to claim 11 and further comprising:

a generally cylindrical insulator that forms the outermost portions of the plasma torch, and a nozzle retaining member carried by said insulator.

16. A plasma torch assembly according to claim 15 and further comprising a nozzle carried by said retaining member in spaced surrounding relationship to said electrode, said nozzle having a nozzle orifice therein through which plasma gas can pass to form the plasma arc.

17. A plasma torch assembly according to claim 16 wherein said nozzle and said retaining member are formed of electrically conductive materials and are in conductive contact with one another, and wherein said torch assembly further comprises means for providing a pilot arc current to said retaining member and said nozzle for initiating a plasma arc in said torch between said nozzle and said electrode that can in turn initiate a transferred plasma arc between said electrode and a workpiece.

18. A plasma arc torch according to claim 16 wherein said nozzle, said electrode, said electrode body, said adaptor and said retaining member are all formed of conductive metal.

19. A plasma arc torch according to claim 11 wherein said plasma gas ports in said adaptor are in a different annular portion of said adaptor from said cooling gas ports.

20. An electrode adaptor that provides a removable and replaceable barrier to prevent catastrophic failure of plasma arc torch following failure of an electrode, said adaptor comprising:

an electrically conductive metal adaptor body formed of at least two annular portions joined longitudinally along a common axis with each portion having a different radius as measured from said common axis to the outer surface of each portion;

means for removably fitting said adaptor body to an electrode body;

means for removably fitting said adaptor body to an electrode so that said adaptor can form an electrically conductive path between an electrode body and an electrode;

a cylindrical central conduit extending entirely through said adaptor body and coaxial with said common axis for providing a gas flow path through said adaptor to a torch electrode;

a first set of plasma gas exit ports perpendicular to said central conduit and in fluid communication with said central conduit and positioned within one of said annular portions of said adaptor body for providing a gas flow pat from said conduit to the exterior of an electrode, and a second set of cooling gas exit ports perpendicular to said central conduit and in fluid communication with said central conduit and positioned within a different annular portion of said adaptor body from said plasma gas exit ports for providing a gas flow path from said conduit to the exterior of a plasma torch assembly to thereby help cool the torch and its nozzle during plasma arc operation.

* * * * *

UNITED STATES PATENT AND TRADEMARK OFFICE
CERTIFICATE OF CORRECTION

PATENT NO. : 5,214,262
DATED : May 25, 1993
INVENTOR(S) : Carkhuff

It is certified that error appears in the above-identified patent and that said Letters Patent is hereby corrected as shown below:

Column 4, line 68, after "novel", insert -- structure --

Column 7, line 5, after "with", insert -- said central conduit --

Column 7, line 39, "tan" should be -- than --

Column 8, line 48, after "of" (first occurrence), insert -- a --

Column 9, line 1, "pat" should be -- path --

Signed and Sealed this

Eighth Day of February, 1994

Attest:

Bruce Lehman

BRUCE LEHMAN

*Attesting Officer* *Commissioner of Patents and Trademarks*